(12) United States Patent
Peralta

(10) Patent No.: US 7,584,129 B1
(45) Date of Patent: Sep. 1, 2009

(54) ESCROW METHOD FOR SETTLEMENT OF TAX LIENS ("EMSTL"™) (FEDERAL, STATE, LOCAL) OF LIENHOLDERS AGAINST REAL PROPERTY (RESIDENTIAL, COMMERCIAL, OTHER)

(76) Inventor: Leslie Ann Peralta, P.O. Box 41275, Sacramento, CA (US) 95160-1275

( * ) Notice: Subject to any disclaimer, the term of this patent is extended or adjusted under 35 U.S.C. 154(b) by 412 days.

(21) Appl. No.: 11/336,576

(22) Filed: Jan. 21, 2006

Related U.S. Application Data

(60) Provisional application No. 60/676,879, filed on May 2, 2005.

(51) Int. Cl.
*G06Q 40/00* (2006.01)
(52) U.S. Cl. ........................................................ 705/35
(58) Field of Classification Search .................... 705/35
See application file for complete search history.

(56) References Cited

U.S. PATENT DOCUMENTS

2006/0020541 A1* 1/2006 Gommlich ............... 705/40

OTHER PUBLICATIONS

Alfred A. Ring, "Real Estate Pinciples and Practices," 1972, Prentice-Hall, Inc., 7th Edition, pp. 192-196.*

* cited by examiner

*Primary Examiner*—Charles R Kyle
*Assistant Examiner*—David L Wood

(57) ABSTRACT

A new method for recovery of tax revenues in lien status to federal, state or local taxing authorities, or any combination thereof, which revenues have to date remained previously undetectable and therefore uncollectable. The method involves a new use for the real property escrow process and utilizes a new, non-title related and previously unperformed tax lien search to be performed during the real property escrow process on any lienholder, for purposes of proceeds diversion to taxing authorities, against subject property in transaction status, when such lienholder is other than a regulated financial institution and with whom the subject property owner has no real property ownership relationship or interest.

3 Claims, 2 Drawing Sheets

DRAWINGS  FLOWCHART - PREFERRED EMBODIMENT - FIG. 1
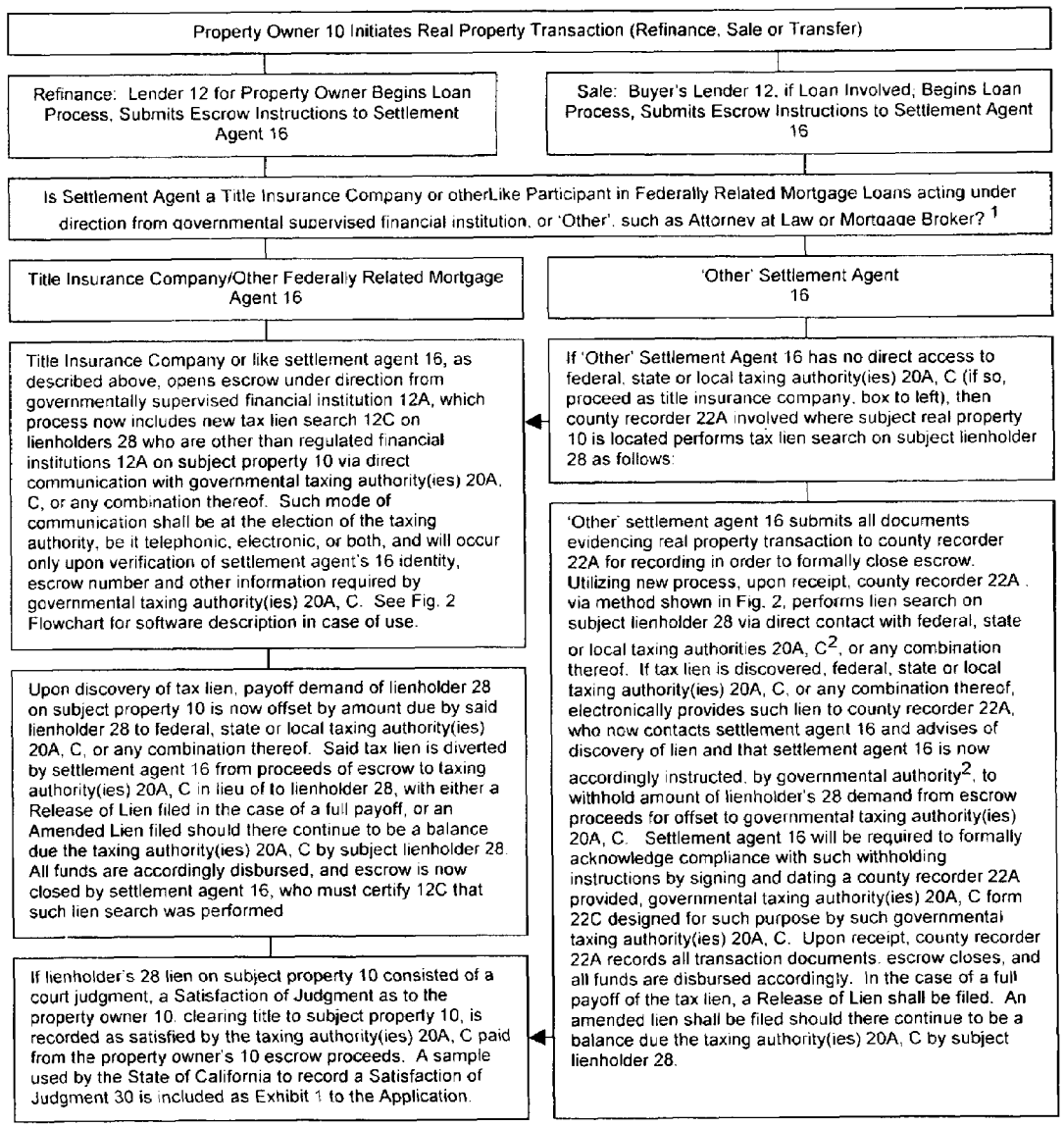

DRAWINGS – FLOWCHART – PREFERRED EMBODIMENT – GOVERNMENTAL

TAX LIEN SOFTWARE QUERY METHOD – FIG. 2

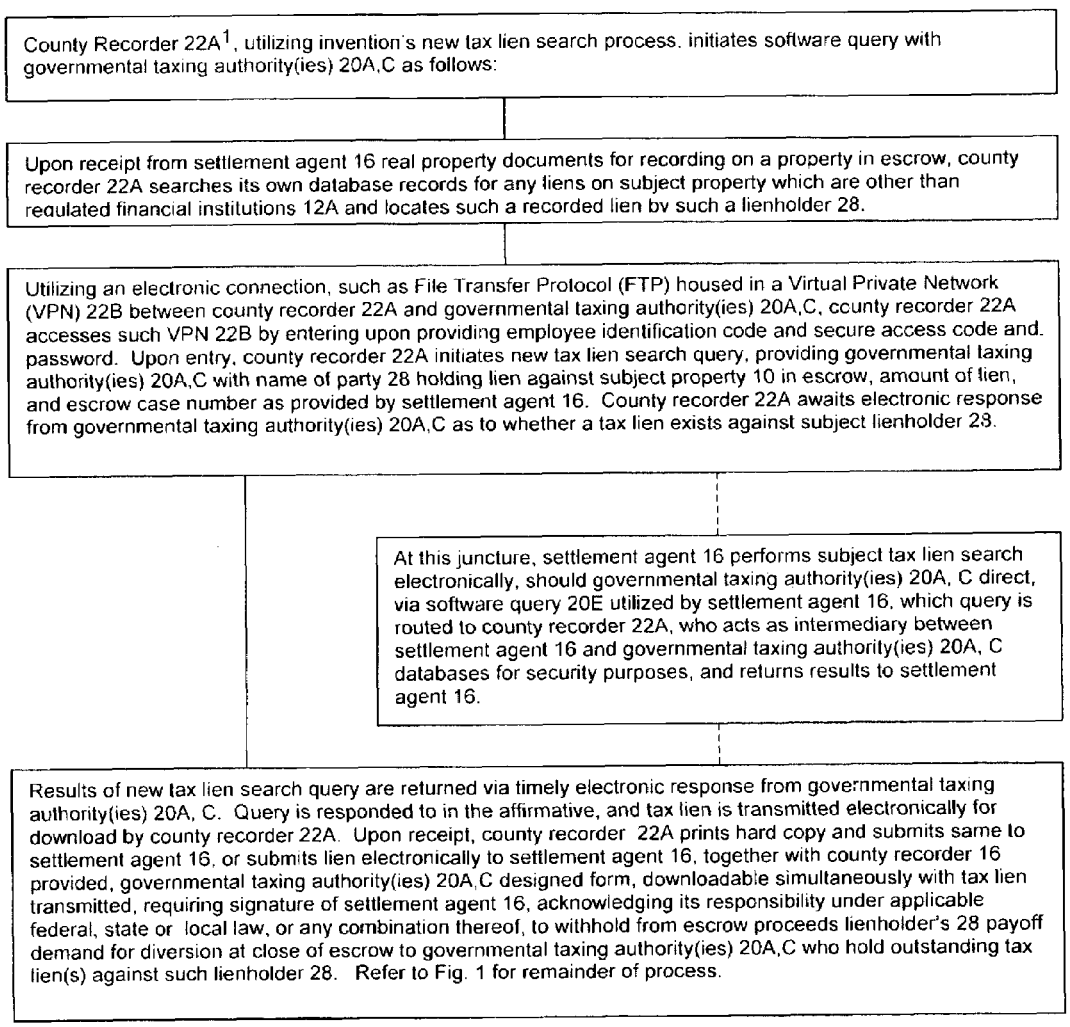

County Recorder 22A[1], utilizing invention's new tax lien search process, initiates software query with governmental taxing authority(ies) 20A,C as follows:

Upon receipt from settlement agent 16 real property documents for recording on a property in escrow, county recorder 22A searches its own database records for any liens on subject property which are other than regulated financial institutions 12A and locates such a recorded lien by such a lienholder 28.

Utilizing an electronic connection, such as File Transfer Protocol (FTP) housed in a Virtual Private Network (VPN) 22B between county recorder 22A and governmental taxing authority(ies) 20A,C, county recorder 22A accesses such VPN 22B by entering upon providing employee identification code and secure access code and password. Upon entry, county recorder 22A initiates new tax lien search query, providing governmental taxing authority(ies) 20A,C with name of party 28 holding lien against subject property 10 in escrow, amount of lien, and escrow case number as provided by settlement agent 16. County recorder 22A awaits electronic response from governmental taxing authority(ies) 20A,C as to whether a tax lien exists against subject lienholder 28.

At this juncture, settlement agent 16 performs subject tax lien search electronically, should governmental taxing authority(ies) 20A, C direct, via software query 20E utilized by settlement agent 16, which query is routed to county recorder 22A, who acts as intermediary between settlement agent 16 and governmental taxing authority(ies) 20A, C databases for security purposes, and returns results to settlement agent 16.

Results of new tax lien search query are returned via timely electronic response from governmental taxing authority(ies) 20A, C. Query is responded to in the affirmative, and tax lien is transmitted electronically for download by county recorder 22A. Upon receipt, county recorder 22A prints hard copy and submits same to settlement agent 16, or submits lien electronically to settlement agent 16, together with county recorder 16 provided, governmental taxing authority(ies) 20A,C designed form, downloadable simultaneously with tax lien transmitted, requiring signature of settlement agent 16, acknowledging its responsibility under applicable federal, state or local law, or any combination thereof, to withhold from escrow proceeds lienholder's 28 payoff demand for diversion at close of escrow to governmental taxing authority(ies) 20A,C who hold outstanding tax lien(s) against such lienholder 28. Refer to Fig. 1 for remainder of process.

---

[1] At the discretion of the governmental taxing authorities, title insurance companies and other like settlement agents may be included in described software access. If such access by any parties other than county recorders is disallowed for security purposes by the governmental taxing authorities, specifically to limit access to such information, such other parties shall nonetheless initiate the new lien search process on behalf of federal, state and local taxing authorities via the involved county recorders office, who shall perform the new tax lien search as articulated above.

ESCROW METHOD FOR SETTLEMENT OF TAX LIENS ("EMSTL"™) (FEDERAL, STATE, LOCAL) OF LIENHOLDERS AGAINST REAL PROPERTY (RESIDENTIAL, COMMERCIAL, OTHER)

CROSS REFERENCE TO RELATED APPLICATIONS

This application claims the benefit of Provisional Patent Application No. 60/676,879, filed May 2, 2005 by the above-named inventor.

BACKGROUND OF THE INVENTION

1. Field of Invention

This invention relates to recovery of outstanding governmental tax revenues in lien status, specifically a new and previously unused method of such recovery.

2. Prior Art

Every year in the United States, countless real property transactions, of a residential, commercial or other nature, open and close escrow, resulting in the sale, refinance or transfer of such real property. At every such closing, handled by any legally authorized settlement or escrow agent such as title insurance companies, attorneys at law, and other such authorized parties, hereinafter referred to as settlement agents, all liens against the subject property, including tax liens, are settled. Specifically, lienholders against such subject property are paid and title is thus cleared as to the subject property, at which time the property is now refinanced or transferred. With respect to tax liens, be they federal, state or local, or any combination thereof, if such a lien existed against the subject property or its owner of record, said lien would of course be satisfied at subject close of escrow, resulting in the taxing authorities recovering taxes due, as appropriate.

From a tax revenue recovery perspective, a very real shortcoming exists with the above process, which is and continues to be standard procedure in the United States with respect to real property transactions of a residential, commercial or other nature. Specifically, the current process omits entirely a very substantial tax lien recovery mechanism which would immediately assist federal, state or local tax revenue recovery efforts, or any combination thereof, in situations where a federal, state or local tax lien, or any combination thereof, exists not against the subject property in escrow or its owner, but rather against a lienholder on the subject property.

Specifically, there are indeed instances involving real property transactions where federal, state or local governmental taxing authorities, or any combination thereof, are due taxes by certain parties who are other than the property owner of record. These outstanding tax obligations are in fact in lien status but are currently undetectable, and therefore uncollectable, to said governmental taxing authorities as a result of said real property being owned by another party, which third party has no real property ownership relationship, such as a community property interest, a joint tenancy interest, a tenancy in common interest, or any other ownership interest, with the party who in fact owes such outstanding tax lien. For example, there are instances where a party against whom a governmental tax lien exists in turn places a lien, such as a judgment lien, a personal note, or some other type of lien against the real property of another party, which third party, as indicated above, has no real property ownership relationship with the party who in fact owes such outstanding tax lien. However, the party owing the tax lien, as a lienholder on the subject property in transaction status, then collects on said lien, with interest, when subject real property is refinanced or transferred at close of escrow. While the governmental taxing authorities possess the necessary legal authority to intercept such monies at close of escrow in lieu of the subject lienholder, under the current real property escrow process in the United States, no process exists or is utilized for checking the status of such lienholders. Indeed, settlement agents currently check and investigate title and status solely on the subject property, and any liens attaching thereto, and not the status of any party, as described above, who is other than a regulated financial institution or entity claiming a lien on said property. As a result, such undetectable tax revenues in lien status as articulated above could be recovered but in fact are not under the current limited escrow process. It is therefore estimated that the tax revenues in lien status lost on an annual basis, to the United States Treasury alone, could total as much as tens of millions, to perhaps billions, of dollars.

Further, in the described real property transactions, as indicated, such lienholders are paid by the settlement agents at close of escrow to satisfy the liens they have against the subject real property. These payments, however, are not reported to the Internal Revenue Service, and possibly not to state or local governmental taxing authorities as well, due to the $10,000, an occasionally lower, reporting threshold. Even in cases of tax liens greater than $10,000, such escrow payments to said lienholders, if they are in fact ever reported, are reported in the year following the payment, not at close of escrow when such lienholders receive payment. Therefore, such lienholders, and not the federal, state or local taxing authorities, or any combination thereof, receive this money, even though if a governmental tax lien exists against such a lienholder, this money legally belongs to that governmental taxing authority, and not the lienholder. This is lost revenue to the federal, state or local taxing authorities, or any combination thereof, and it need not be. Thus, the shortcomings and disadvantages of the prior art real property escrow process include the following:

(a) The current process limits entirely its lien searches to the subject property and that property's owner through the standard and well known title search, which reveals all liens and encumbrances as to that property and its owner only.

(b) As a result of such limited and incomplete lien searches involving real property in transaction status, such as a refinance or sale, governmental tax revenues legally collectable yet undetectable due to ownership of the involved real property in the name of a party who is other than the party owing the governmental tax lien and which party has no real property ownership relationship, as described above, with the party owing the outstanding tax lien, are not recovered at close of escrow when funds are disbursed. This results in substantial revenues in the form of outstanding tax liens lost on an annual basis to federal, state or local taxing authorities, or any combination thereof.

OBJECTS AND ADVANTAGES

Accordingly, aside from the objects and advantages of the new process described in the patent application, several objects and advantages of the present invention are:

(a) The new, non-title related lien search would in some cases reveal outstanding governmental tax liens owed by a lienholder as described above who stands to collect monies with interest as a result of any lien such lienholder has recorded against subject property in escrow.

(b) As a result of the present invention involving the new and extended lien search to a real property lienholder as described above, when a tax lien against such a real property lienholder as described above is revealed, substantial revenues in the form of outstanding tax liens may be recovered to federal, state or local governmental taxing authorities, or any combination thereof, on an annual basis. It is further anticipated that the invention of this new process will achieve the above financial result on behalf of federal, state or local taxing authorities, or any combination thereof, to said governmental agencies at no cost with the exception of a negotiated administrative filing fee, as articulated in Preferred Embodiment, and possibly a software development cost.

Still further objects and advantages will become apparent from a consideration of the ensuing description and flowcharts.

SUMMARY

In accordance with the present invention, a method for recovery to federal, state or local taxing authorities, or any combination thereof, of outstanding tax revenues in lien status. Said revenues, which may result in substantial increased revenues on an annual basis to the governmental taxing authorities, shall be recovered by the addition of a new, easily implemented, and heretofore unused, non-title related component to the real property escrow process.

BRIEF DESCRIPTION OF THE DRAWINGS

FIG. 1 is a detailed flowchart of the preferred embodiment of the invention.

FIG. 2 is a detailed flowchart of the software component of the preferred embodiment of the invention, described fully in the Additional Embodiments section of the Specification, as it is a component to the invention whose use or non-use in the preferred embodiment form of the invention will be determined by the subject federal, state or local, or any combination thereof, agency(ies).

DRAWINGS

Reference Numerals

Reference Numerals

(10) Property Owner(s), Subject Property (12A) Regulated Financial Institutions (12B) Federal, State and Other Financial Institution Regulators (not shown)

(12C) Federal, State and Other Financial Institution Regulators Instructive Form

(14) Office of Management and Budget (not shown)

(16) Settlement (Escrow) Agents, such as Title Insurance Companies, Attorneys at Law, Other

(18) Offices of Secretary of State (not shown)

(20A) Internal Revenue Service, Department of the Treasury (20B) Automated Lien System Database ('ALS'), internal Revenue Service (not shown)

(20C) State and Local Taxing Authorities (20D) Lien Databases, State and Local Taxing Authorities (not shown)

(20E) Software for Electronic Tax Lien Search Queries (FIG. 2, for Settlement Agent 16 Query, Routed through County Recorder 22A)

(22A) County Recorders (22B) Electronic Link to Taxing Authorities, such as a Virtual Private Network, for Use Between Governmental Taxing Authority(ies) 20A, C and County Recorders 22A (22C) Governmental Taxing Authority(ies) Form Instructing Settlement Agents to Withhold Escrow Proceeds from Lienholder 28

(24) United States Department of Justice, State Attorneys General (not shown)

(26) State Insurance Commissioners (not shown)

(28) Lienholder(s) on Real Property, Other than regulated Financial Institutions

(30) Satisfaction of Judgment

DETAILED DESCRIPTION

Preferred Embodiment

A residential, commercial or other property owner 10 initiates a refinance, sale or transfer of real property, which transaction involves a financial institution 12A usually regulated by federal, state or other financial regulators 12B through the usual escrow process. A new, non-title related, additional component is now added and incorporated into the current escrow process. Specifically, the settlement agent 16 will now be required by the regulated financial institution 12A, in cases where a regulated financial institution 12A is involved and therefore the settlement agent is likely a title insurance company acting at said financial institution's direction, and itself regulated by state insurance commissioners 26, to perform a telephonic or electronic, such mode or modes at governmental taxing authority(ies) 20A, C election, governmental tax lien search on behalf of federal, state or local taxing authorities 20A, C, or any combination thereof, on any non-regulated lienholders 28. Such lienholders 28 will include a judgment lien creditor, a promissory note holder, or other, on the subject property 10 and its owner 10. In cases where the settlement agent 16 is other than a title insurance company, such as an attorney at law, a mortgage broker, or other, the county recorder 22A will now perform such tax lien search on subject lienholder 28 and record the transaction in order that escrow may close only upon completion of said search on behalf of federal, state or local taxing authorities 20A, C, or any combination thereof.

The objective of such new lien search is that a federal, state or local 20A, C tax lien, or any combination thereof, may exist against such lienholder 28. The intent of the invention is to locate such tax liens and collect on said liens when the party owing the tax lien 28 is in the process of collecting monies with interest as a result of any lien such party 28 may have recorded against the real property 10 of another, as described above, and such real property 10 is involved in the escrow process. Under the current, limited real property escrow process, which includes a title search which by definition and scope is limited to the subject property and its owner only, such tax lien revenues presently remain undetectable and therefore uncollectable due to the real property in transaction status being owned by a property owner 10 who is other than the party owing the tax lien 28, and which property owner 10 has no real property relationship or interest with that party 28, as described above. It is anticipated that the method described in the invention may result in substantial tax revenues recovered by federal, state or local taxing authorities 20A, C, or any combination thereof, on an annual basis.

OPERATION

Preferred Embodiment—FIG. 1

A residential, commercial or other type property owner 10 enters into a real property transaction, typically a sale, refinance or other transfer. At the present time, in the ordinary course of business, the settlement agent 16 involved performs a title search on the subject property only, which reveals any and all liens against said property 10 and subject property's owner 10, which attaches to subject property 10. Oftentimes, such searches reveal liens against the subject property 10 which are other than regulated financial institution liens, and which liens may have been recorded by a private mortgage holder, a judgment lien creditor, or other type of lienholder 28. Such liens must be satisfied upon the close of escrow in the subject real property transaction. In the current state of such transactions, the involved financial institution 12A, and the settlement agent 16, acting at said institution's 12A direction, if for instance such settlement agent 16 is a title insurance company, ensures that such liens are paid to the subject lienholder 28 upon receipt of said party's 28 written payoff demand, out of the settlement proceeds of such real property transactions. Upon proper recording with the subject county recorder 22A of all appropriate documents in such real property transaction and all subsequent disbursements, escrow is closed. Such liens are satisfied even in cases where the lender, in the event the property is being sold, is other than a regulated financial institution, or in an all cash real property transaction, as title to the subject property must be cleared prior to reconveyance or transfer.

In the present invention, the new, non-title related process in such real property transactions would ensure that such outstanding tax lien owed by a lienholder 28 against any real property 10 would, at close of escrow, instead be diverted directly to the Internal Revenue Service 20A, or the appropriate state or local taxing authority(ies) 20C, or any combination thereof. Should the amount of the tax lien owed by said lienholder 28 exceed the amount of the lien said lienholder 28 has recorded against the subject property 10 or property owner 10, then the entire amount of such lien against the property 10 or property owner 10 shall be paid to the Internal Revenue Service 20A or the appropriate state or local taxing authority(ies) 20C, or any combination thereof, in lieu of being paid to said lienholder 28 out of the subject escrow proceeds. Thereafter, the Internal Revenue Service 20A or the appropriate state or local taxing authority(ies) 20C, or any combination thereof, would file an amended tax lien against the subject party 28 reflecting such reduction in the amount which continues to be due. Conversely, should the amount of the tax lien owed by said lienholder 28 be less than the subject lien said lienholder 28 has recorded against the subject property 10, then the federal, state or local tax liens, or any combination thereof, existing against said lienholder 28 shall be satisfied first out of any escrow proceeds in the subject transaction, with the balance then being paid to said lienholder 28 out of the escrow proceeds.

In this new escrow process, given that the various federal and state financial institution regulators 12B have authority to supervise such financial institutions 12A, they will be involved in this capacity, with ultimate oversight by the Office of Management and Budget 14 in cases of federal tax liens, to ensure that financial institutions 12A involved in the subject real property 10 transactions described above include, in their escrow instructions to the settlement agents 16 involved in the subject real property 10 transaction, the additional documentation which shall be supplied via a form 12C which shall be designed by such financial institution regulator 12B appropriate to the particular financial institution 12A involved in the subject escrow. Such form will articulate the requirement on the part of the settlement agent 16 to perform telephonically, or electronically via the software query program 20E, which mode or modes shall be at the election of the governmental taxing authority(ies) 20A, C, the newly required electronic governmental tax lien search on behalf of federal, state or local taxing authorities 20A, C, or any combination thereof, on any non-regulated lienholder 28 against the subject property 10 in order to settle, at close of escrow, any and all outstanding federal, state or local tax liens, or any combination thereof, which may be due and payable by such lienholder 28 to the governmental taxing authority(ies) 20A, C. Such form 12C, in separate part from instructive section, shall further serve as verification that such new, non-title related tax lien search has been performed, confirm any and all information discovered, disclose the source of the information, include as an attachment any tax lien(s) discovered against such lienholder 28, and confirm that proceeds have in fact been withheld. Escrow will not close until this new procedure has been completed and the new form 12C has been executed and certified by the settlement agent 16 and thereafter returned to the financial institution 12A, the governmental taxing authority(ies) 20A, C, and available to the financial institution regulator 12B, as once escrow has in fact closed, without this new process, any tax liens which could have been paid out of escrow proceeds in the subject real property 10 transaction are lost to federal, state or local taxing authority(ies) 20A, C, or any combination thereof, and such liens remain outstanding and unpaid.

As depicted in FIG. 1, there are also real property transactions involving a settlement agent 16 who is other than, for instance, a title insurance company acting on behalf of and at the direction of a regulated financial institution 12A, where compliance with the federal Real Estate Settlement Procedures Act ('RESPA') and resultant HUD-1 Settlement Statement, in non-commercial transactions, is mandatory. Such other settlement agent 16 may be an attorney at law, a mortgage broker, or other. In such instances, to ensure no circumvention of the new process occurs and thus potential tax revenues are lost, the process for locating any potential tax lien existing against the subject lienholder 28 against the subject real property 10 in escrow will be accomplished as follows:

(a) Upon receipt for recording of all documents necessary to the real property 10 transaction by the settlement agent 16 to the county recorder 22A, the county recorder 22A now performs the new non-title related tax lien search against any lienholder 28 on subject real property 10 who is other than a regulated financial institution. This process is accomplished by the county recorder 22A first running a simple county database check as to the real property 10 involved in the subject transaction and locating any liens against the subject property 10 by a lienholder 28 who is other than a regulated financial institution 12A. Once located, the county recorder 22A then, via direct communication with federal, state and local taxing authority(ies) 20A, C, then performs the new governmental tax lien search on behalf of federal, state or local taxing authority(ies) 20A, C, or any combination thereof. Such direct communication will consist of a dedicated telephone line to each governmental taxing authority(ies) 20A, C for such purpose, an electronic connection such as a Virtual Private Network (VPN) 22B connection utilizing File Transfer Protocol (FTP) between the involved county recorder 22A and said governmental taxing authority(ies) 20A, C, which connection will perform a simple query as depicted in the software flowchart in FIG. 2, and further discussed in Additional Embodiments, or both. Again, such mode or modes of the tax lien search shall be at the election of the governmental taxing authority(ies) 20A, C. In accordance with Internal Revenue Code Sections 6321, 6322, 6323, state and local corresponding codes, the Uniform Federal Lien Registration Act, the US Constitution, Article IV, Section 1, and all other applicable laws, the states and counties involved in such new, non-title related tax lien search will be those applicable to such lienholder's 28 residence and location of real and personal property.

(b) Once a federal, state or local tax lien, or any combination thereof, is in fact located against such lienholder 28 as a result of such new, non-title related tax lien search, the county recorder 22A electronically downloads the subject tax lien from the governmental taxing authority(ies) 20A, C. The settlement agent 16 involved is then notified immediately by the county recorder 22A of the existence of such tax lien against such lienholder 28 who has made a payoff demand during the escrow process on the subject property 10 and its owner 10. Thereafter, the settlement agent 16 is instructed, by governmental taxing authority(ies) 20A, C via the county recorder 22A to withhold the amount of lienholder's 28 demand from escrow proceeds for offset to governmental taxing authority(ies) 20A, C. The settlement agent 16 will then be required to formally acknowledge compliance with such withholding instructions by signing and dating a county recorder 22A provided, governmental taxing authority(ies) 20A, C form designed for such purpose by such governmental taxing authority(ies) 20A, C. Upon receipt, county recorder 22A records all appropriate real property transaction documents as submitted by settlement agent 16, all funds are disbursed as appropriate, including satisfaction of governmental tax liens as described in the present invention, and escrow closes. In the case of a full payoff of such tax lien, a Release of Lien shall be filed by the governmental taxing authority(ies) 20A, C as to the lienholder 28. In the case of a partial payoff, such as in the case of the tax lien(s) owed by such lienholder 28 being in an amount that is greater than the lien such lienholder 28 had recorded against subject real property 10, an amended tax lien shall be filed as to the balance which continues to be due the governmental taxing authority(ies) 20A, C by subject lienholder 28.

(c) If lienholder's 28 lien on subject real property 10 consisted of a court judgment, a Satisfaction of Judgment 30 as to the property owner 10, which accordingly clears title as to the subject property 10, is now recorded as satisfied by the governmental taxing authority(ies) 20A, C paid from the property owner's 10 escrow proceeds. The governmental taxing authority(ies) 20A, C may request that the county recorder 22A perform this administrative task on its behalf and may remit to such county recorder 22A an administrative filing fee on a monthly basis for all such transactions.

(d) In the unlikely event the escrow proceeds recovered from the property owner 10 at close of escrow are less than the lienholder's 28 payoff demand, and as a result the governmental taxing authority(ies) 20A, C will not therefore receive the amount due by said lienholder 28, the governmental taxing authority(ies) 20A, C shall nonetheless collect any such escrow proceeds in full, and thereafter Satisfaction 30 as to the property owner 10, which is necessary to clear title as to subject property 10, shall occur as follows:

i) Consistent with Exhibit 1, the sample California Judicial Form for Satisfaction of Judgment, the taxing authority(ies) 20A, C will be listed as the Assignee of Record, by legal authority to such proceeds, with the further notation that such assignment is limited to the specific amount recovered. This limitation is due to the fact that the lienholder 28 involved in the subject real property transaction, and not the property owner 10 against whose property 10 the proceeds were recovered by the governmental taxing authority(ies) 20A, C by appropriate exercise of law with respect to lawful interception of said proceeds, is in fact the party obliged to satisfy the tax lien in full. Accordingly, any balance which remains due and payable with respect to said tax lien by said lienholder 28 after close of escrow in the subject real property transaction shall of course be due and payable by said lienholder 28. The taxing authority(ies) 20A, C, therefore, shall file an Amended Tax Lien against such lienholder 28 in such case, reflecting any balance which continues to be due by said lienholder 28.

ii) The Satisfaction will be filed by the taxing authority(ies) 20A, C who recovered said proceeds at close of escrow in the subject real property 10 transaction and full satisfaction, which will clear title to subject property 10, will be noted on said form as to the property 10 and property owner 10, consistent with the reasoning in (i), above.

The invention achieves its objective of locating such previously undetectable and therefore uncollectible tax revenues in lien status, which liens are never revealed in a title search, without cost to property owners 10, who must clear liens attaching to the subject property 10 in escrow, which are revealed in a title search, regardless of who receives the proceeds, as well as no cost to buyers, lenders 12A, settlement agents 16, or county recorders 22A, as most of not all of the means necessary to implement the invention presently exist and are accomplished as articulated in the invention as described. The only cost involved in connection with recovery of such tax revenues is borne by the governmental taxing authority(ies) 20A, C in the form of an administrative filing fee to be paid the county recorder's office 22A for filing of a Satisfaction of Judgment 30 against the subject property 10 as a result of the escrow proceeds such taxing authority(ies) 20A, C recovered as a result of implementation of the invention. Additionally, should it be necessary or desirable to the governmental taxing authority(ies) 20A, C, the one additional cost would be the new software programs 20E and 22B shown in FIG. 2 and described further in Additional Embodiments in order to perform the process, which would also be paid for by the governmental taxing authority(ies) 20A, C, should such software capabilities not currently exist.

Time shall be of the essence in carrying out the new process, as the property owner 10 involved is not the party 28 owing the subject tax lien the new, non-title related search is expected to reveal and as to such property owner 10, such property owner 10 shall not be inconvenienced as a result of any delay in such search or resolution of any tax lien dispute which may arise between the governmental taxing authority 20A, C holding the lien and the party 28 owing said tax lien.

Accordingly, a simple solution to this unlikely scenario, should it occur, is that the amount of monies the governmental taxing authority(ies) 20A, C claims as due from that party 28 may simply be withheld from any escrow disbursements made in the subject real property 10 transaction upon a timely closing of escrow on behalf of the property owner 10. Until such hypothetical and unlikely scenario is resolved between any governmental taxing authority 20A, C and the party owing said tax lien 28, the settlement agent 16 would simply hold such proceeds and upon resolution disburse said proceeds according to the resolution of the matter.

Additional Embodiments

Tax Lien Query Software Embodiment. Software programs 20E and 22B, specifically their development and implementation, shall be completely at the election of the taxing authorities 20A, C, as the live, dedicated telephone query between the parties can also be utilized, as indicated in FIG. 1. One, or both methods, shall be utilized in the invention, again at the election of the taxing authority involved 20A, C. Further, the described software 22B, again at the election of the taxing authority(ies), 20A, C, may be designed to allow direct access by the county recorder 22A to the systemwide databases of the governmental taxing authority(ies) 20A, C for purposes of implementation of the invention, as opposed to the simple software query process described in FIG. 2 which awaits a response from authorized personnel at the governmental taxing authority(ies) 20A, C.

Further, regarding any involved settlement -agent 16 for purposes of implementation of the invention, specifically to perform the new, non-title related tax lien search, FIG. 2 provides a description of a simple software function which can be written to perform such queries. such queries. Though the taxing authorities maintain their own respective systemwide databases on such tax lien information, for instance the Internal Revenue Service 20A maintains its Automated Lien System 20B which contains all such information, for security purposes the settlement agent 16 should not have direct access to any governmental taxing authority(ies) 20A, C systemwide database information. Thus, the software query function shown in FIG. 2 regarding settlement agents 16 should be written to provide the tax lien information to the settlement agent 16, which information is retrieved from the subject taxing authority's database, without ever allowing direct access to such database by the settlement agent 16. This is accomplished by the software query being routed to the involved county recorder 22A, and not directly to the governmental taxing authority(ies) 20A, C, which county recorder 22A acts as the electronic intermediary in order to retrieve the information, which said county recorder 22A accomplishes as depicted in FIG. 2. In effect, the intentionally limited query software function 20E designed for use by the settlement agent 16, which is then routed through the county recorder's 22A VPN link 22B, which will provide a buffer between the settlement agent 16 and the confidential systemwide databases maintained by the taxing authorities 20A, C to ensure security and protect and maintain confidentiality with respect to all other taxpayers in the taxing authority(ies) 20A, C systemwide databases.

Another additional embodiment to the proposed invention would be to include, in addition to the Form 12C described in Preferred Embodiment—Operation, an affidavit or declaration, provided by the governmental taxing authority(ies) 20A, C, which the lienholder 28 would be required to complete and submit to said settlement agent 16, along with its payoff demand. This form would require the lienholder 28 to affirm or deny the existence or non-existence of any federal, state or local tax lien, or any combination thereof, which may exist against said lienholder 28 and which affidavit or declaration would require disclosure by subject lienholder 28 of any and all states resided in, consistent with applicable law, for tax lien search purposes. If it were subsequently discovered that such lienholder 28 supplied false or misleading information on such documentation regarding not only tax lien information but additionally false or misleading information with respect to the lien against the property 10 or property owner 10, for example an illegal or inflated sum charged against property owners' 10 escrow proceeds, unlawful alteration of a court judgment, or other such false information, said lienholder 28 would be subject to civil or criminal penalties and fines, or any combination thereof, to be determined by the appropriate governmental agency(ies) 24 (not shown).

In the event the settlement agent 16 is uncooperative, for instance refuses to honor any documentation or records other than the lienholder's 28 written payoff demand, in particular if there is documentation to the contrary, such as an actual court judgment the lienholder 28 has unlawfully altered to such lienholder's 28 benefit and to the detriment of the property owner 10, or the settlement agent 16 literally refuses to complete the escrow until the property owner 10 complies with the false and illegal demand of the lienholder 28, or the lienholder 28 in any manner falsifies any information furnished in the subject payoff demand customarily submitted to the settlement agent 16, then appropriate law enforcement agencies, such as the US Department of Justice 24 (not shown) or the appropriate State Attorney(s) General's Office 24 (not shown), or both, shall have authority to prosecute or fine, or both, in a manner and sum to be determined by appropriate governmental agencies, such settlement agent 16 and lienholder 28. Additionally, consistent with the federal Real Estate Settlement Procedures Act ('RESPA') in applicable transactions, violations by settlement agents 16 of the process should it be required of them shall also serve as a basis for action by the Attorney General 24 (not shown) and insurance Commissioner 26 (not shown) of any involved state.

The law enforcement components described in paragraphs 20 and 21, though not necessary to the implementation of the invention, are beneficial and complementary elements to the invention nonetheless because if settlement agents 16 are instructed as articulated in the invention to implement the new procedure, yet face no consequences for failing or refusing to do so, or are in any way complicit with a lienholder 28 who attempts to obtain sums which exceed what is legally allowed by law as to any lien such lienholder 28 holds against subject property 10, then such settlement agent 16 may in fact not comply with the new procedure, resulting in potentially billions of dollars lost to the federal, state or local taxing authorities 20A, C, or any combination thereof. Further, if the property owner 10 refuses to close escrow with the involved settlement agents 16 due to such lack of cooperation and lawful compliance on the part of the settlement agent 16 and lienholder 28, escrow in fact may not close, as the property owner 10 may cancel the transaction entirely as a result of such misconduct on the part of the lienholder 28 and the settlement agent 16. This scenario can, and indeed does, occur, purported recourse to the property owner 10 notwithstanding. Thus, if escrow does not close, there are accordingly no escrow proceeds from which the federal, state or local taxing authorities 20A, C, or any combination thereof, could recover outstanding tax liens from the subject lienholder 28, as the tax lien obligation lies with the lienholder 28, and not the property owner 10, who has every right to cancel the transaction should such property owner 10 choose to do so.

The financial institutions 12A, for their part, also lose, as the subject real property 10 transaction may not close in such circumstances, and the subject loan and accompanying interest is also lost to them, the lost profits of which are likely highly significant, as described further in Alternative Embodiments.

Alternative Embodiments

An alternative embodiment of the proposed invention would be for the settlement agent 16 to conduct an online Uniform Commercial Code (UCC) or real property ownership records search, or both, on the subject lienholder 28 during the subject real property escrow process. Specifically, this would serve to determine whether the lienholder 28 is a property owner, which would locate any recorded tax lien against such party, or if such lienholder 28 owns no real property, the UCC records database search would reveal any outstanding tax liens which may exist against such lienholder 28. Upon locating such a lien, the federal, state or local governmental taxing authority(ies) 20A, C, or any combination thereof, would thereafter be able to intercept tax monies due such taxing authority(ies) 20A, C at close of escrow on subject property 10 transaction, the remainder of the process being as articulated in Preferred Embodiment—Operation.

Another alternative embodiment would be for regulated financial institutions 12A to participate via implementation of the invention on a self-directed basis and experience additional profits in the form of additional loan closures as a result of the process described in the invention, as financial institutions 12A can be adversely affected in the current limited escrow process as well, including, but not limited to, the following scenarios: (i) lost profits as a result in delaying the closing process due to the scenarios described in Operation, such as interest rate fluctuations which may occur as borrower attempts to locate an alternate settlement agent 16 who operates in compliance with applicable laws with respect to liens on the subject property); (ii) as a result of the scenario described in Alternative Embodiments, the necessity on the part of the financial institution 12A to now re-work and re-issue documentation in connection with the customary commitment letter issued to the borrower, which not only incurs additional administrative and operational costs, but again may result in adverse interest rate consequences to said financial institutions 12A. To a refinancing property owner 10, or to a buyer of the subject property, these fluctuations would likely result in very minor differences with respect to a mortgage obligation, but to financial institutions 12A, in the aggregate, such lost profits could be substantial. Lastly, a significant benefit to financial institutions 12A in implementing the invention is that it ensures compliance with RESPA in applicable transactions, which federal act requires accurate settlement costs and reporting of same regarding the subject property 101 and property owner 10. As a result, financial institutions 12A would be much more likely to avoid any RESPA violations in transactions such as described above in reference to the alternative embodiments.

CONCLUSION, RAMIFICATIONS AND SCOPE

If 1,000,000 such real property transactions per year resulted in recovery of just $1,000-$9,000 per transaction, which is under the customary $10,000 reporting threshold, the amount recovered would total between $1B -$9B annually to the federal, state or local taxing authority(ies) 20A, C, or any combination thereof. The recovery under the proposed invention is even greater in cases of tax liens in excess of $10,000, which, if such payments ever are, are not reported until it is too late for the taxing authorities to recover the money, as the subject lienholder 28 will have long since received and likely retained such payment. In either case, the proposed invention can be immediately implemented, regardless of the tax lien amount, into the escrow process in the United States to achieve this objective, which should provide immediate positive financial results to the federal, state or local taxing authorities 20A, C, or any combination thereof.

Although the description above contains many specificities, these should not be construed as limiting the scope of the invention but as merely providing illustrations of some of the presently preferred embodiments of this invention. For example:

1. The electronic lien search depicted in FIG. 1 can be performed strictly by the county recorder in all cases, which may be preferable to the governmental taxing authority(ies) 20A, C for security purposes, as this would strictly limit access to such tax lien information with respect to implementation of the invention.

Thus, the scope of the invention should be determined by the appended claims and their legal equivalents, rather than by the examples given.

What is claimed is:

1. A method for locating and collecting previously undetectable and uncollected governmental tax revenues in lien status utilizing the real property escrow process, comprising the steps of:

a) Performing a computerized tax lien search during a real property escrow process, wherein such tax lien search is performed on a party who has recorded a lien against the subject property in escrow, which party is other than a regulated financial institution, and which party has no real property ownership relationship or interest in the subject property with the subject property owner, which search results in a return of tax lien information as to the existence or non-existence of any outstanding governmental tax lien against said party;

b) withholding, by computer, and upon discovery of said outstanding governmental tax lien, the amount of tax lien due by said party against said party's payoff demand made against subject property in escrow, by a financial institution, settlement agent, or other authorized party;

c) remitting, directly or indirectly, with or without an intermediary, to said at least one governmental taxing authority by said financial institution, settlement agent, or other authorized party, proceeds from the escrow of said subject property transaction which have been diverted from said party's payoff demand made against the subject property in escrow in order to satisfy said party's outstanding tax lien obligation to said at least one governmental taxing authority;

d) submitting by computer for recording by said at least one governmental taxing authority, directly or indirectly, with or without an intermediary, either a Satisfaction of Lien against said party in the event of a full payoff, or an Amended Tax Lien in the event a balance continues to be due the said at least one governmental taxing authority by said party;

e) submitting by computer for recording by said at least one governmental taxing authority, directly or indirectly, with or without an intermediary, a Full Satisfaction of Judgment as the Assignee of Record regarding the lien said party had recorded against said subject property owner, which lien had attached to said property owner's real property, and from which escrow proceeds said at least one governmental taxing authority receives payment, with the further notation on said Full Satisfaction of Judgment as Assignee of Record that the assignment is not to exceed the amount of proceeds recovered from subject real property transaction, whether such proceeds satisfy said party's tax lien obligation in full or not.

2. A method for locating and collecting previously undetectable and uncollected governmental tax revenues in lien status utilizing the real property escrow process, comprising the steps of:
- a) performing a computerized tax lien search during a real property escrow process, wherein such tax lien search is performed on a party who has recorded a lien against the subject property in escrow, which party is other than a regulated financial institution, and which party has no real property ownership relationship or interest in the subject property with the subject property owner, which search results in a return of tax lien information as to the existence or non-existence of any outstanding governmental tax lien against said party;
- b) withholding, by computer, and upon discovery of said outstanding governmental tax lien, the amount of tax lien due by said party against said party's payoff demand made against subject property in escrow by said financial institution, settlement agent, or other authorized party, for diversion to said at least one governmental taxing authority.

3. A method for locating and collecting previously undetectable and uncollected governmental tax revenues in lien status utilizing the real property escrow process, comprising the steps of:
- a) performing a computerized tax lien search during a real property escrow process, wherein such tax lien search is performed on a party who has recorded a lien against the subject property in escrow, which party is other than a regulated financial institution, and which party has no real property ownership relationship or interest in the subject property with the subject property owner, which search results in a return of tax lien information as to the existence or non-existence of any outstanding governmental tax lien against said party;
- b) withholding, by computer, and upon discovery of said outstanding governmental tax lien, the amount of tax lien due by said party against said party's payoff demand made against subject property in escrow by said financial institution, settlement agent, or other authorized party;
- c) remitting, directly or indirectly, with or without an intermediary, to said at least one governmental taxing authority by said financial institution, settlement agent, or other authorized party, proceeds from the escrow of said subject property transaction which have been diverted from said party's payoff demand made against the subject property in escrow in order to satisfy said party's outstanding tax lien obligation to said at least one governmental taxing authority.

\* \* \* \* \*